W. Carter.
Boat Detaching
No. 86,902.     Patented Feb. 16, 1869.
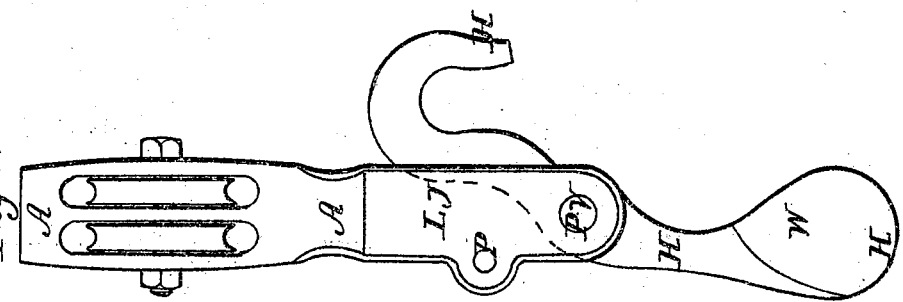
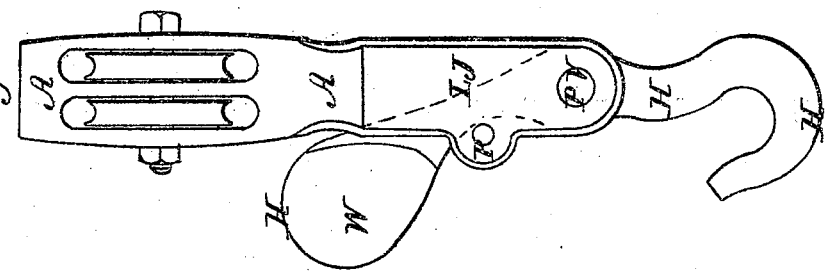
Witnesses:
Isaac R. Oakford
Henry Roellig
Inventor:
William Carter
pr C. H. Evans
atty

WILLIAM CARTER, OF PHILADELPHIA, PENNSYLVANIA.

Letters Patent No. 86,902, dated February 16, 1869.

IMPROVEMENT IN HOOKS FOR TACKLE-BLOCKS.

The Schedule referred to in these Letters Patent and making part of the same.

*To all whom it may concern:*

Be it known that I, WILLIAM CARTER, of the city of Philadelphia, county of Philadelphia, and State of Pennsylvania, have invented a new and useful "Improvement in Hooks for Blocks;" and I do hereby declare that the following is a full, clear, and exact description thereof, reference being had to the accompanying drawings, and to the letters of reference marked thereon, in which—

Figure 1 is a side view of my invention when in proper position and ready for use.

Figure 2 is a side view, showing my hook swung around out of position, and detached from the load or weight.

My object is to suspend a weighted hook to the lower part of blocks, in such a position that the hook will detach itself, the instant the strain is relieved from it, and is especially adapted for lowering boats from vessels, as the hook immediately detaches itself, the instant the boat touches the water.

To enable those skilled in the art to make and use my invention, I will now proceed to describe its construction and operation.

A is a tackle-block, of the ordinary form, to the lower part of which are attached two flat parallel pieces, L J, forming an open jaw, and in which is set a hook, as hereinafter described.

H is the hook, provided with an arm, on which is attached, or formed, a ball-shaped weight, W, having sufficient metal to outweigh the end of the hook.

Thus prepared, I insert the arm of hook H between the parallel pieces L J, and retain it there by means of the pivot-pin P V, on which it works.

Through the sides of the pieces L J, and a short distance above the pivot-pin P V, are made openings, through which passes a pin, P, for the purpose of retaining the hook H in position, as shown in fig. 1, to attach the load, although the pin is almost useless, as it will be seldom used, except in cases where the hook is required to remain stationary.

It will be seen, from the above description, that, in slackening the tackle, or, the article which is attached to the hook having reached a solid base, or water-surface, so as to relieve the strain on the hook, the weight W, outweighing the hook H, will fall, unhook H, and the whole assume the position as shown in fig. 2.

I am aware that two weighted sister-hooks, operating together to form an eye, have been heretofore known; but in this case, the use of an independent hook is necessitated, to enable the device to perform the functions of mine.

I do not broadly claim the use of a weighted hook; neither do I claim any of the above-described parts separately; but having thus fully described my invention,

What I claim therein as new, and desire to secure by Letters Patent, is—

The combination of the parallel pieces L J, single weighted hook H, pivot-pin P V, and pin P, the whole arranged and operating substantially as described.

WILL'M CARTER.

Witnesses:
CHARLES H. EVANS,
SAMUEL L. TAYLOR.